Nov. 2, 1965   M. G. MEAD, JR., ET AL   3,215,935
APPARATUS FOR DETERMINING OUTPUT CURRENT VERSUS
SPEED OF A GENERATOR HAVING VARIABLE IMPEDANCE
LOAD MEANS FOR CONTROLLING GENERATOR
OUTPUT VOLTAGE
Filed Dec. 19, 1960   2 Sheets-Sheet 1

INVENTORS
MATTHEW G. MEAD JR
JACQUES MOSIER
BY
J. R. Faulkner
K. L. Zerschling
ATTORNEYS Nov. 2, 1965

M. G. MEAD, JR., ETAL 3,215,935

APPARATUS FOR DETERMINING OUTPUT CURRENT VERSUS
SPEED OF A GENERATOR HAVING VARIABLE IMPEDANCE
LOAD MEANS FOR CONTROLLING GENERATOR
OUTPUT VOLTAGE

Filed Dec. 19, 1960

MATTHEW G. MEAD JR.
JACQUES MOSIER
INVENTORS

BY J. R. Faulkner
K. L. Zerschling
ATTORNEYS

United States Patent Office 3,215,935
Patented Nov. 2, 1965

3,215,935
APPARATUS FOR DETERMINING OUTPUT CURRENT VERSUS SPEED OF A GENERATOR HAVING VARIABLE IMPEDANCE LOAD MEANS FOR CONTROLLING GENERATOR OUTPUT VOLTAGE
Matthew G. Mead, Jr., Detroit, and Jacques Mosier, Ypsilanti, Mich., assignors to Ford Motor Company, Dearborn, Mich., a corporation of Delaware
Filed Dec. 19, 1960, Ser. No. 76,577
11 Claims. (Cl. 324—158)

This invention relates to means for maintaining a constant terminal voltage on an electrical generator and more particularly to means for determining the load current of an electrical generator as a function of speed and for automatically constructing a curve of the load current as a function of speed.

The present invention is particularly useful and was developed for evaluating rotary electrical generating equipment as a unit, apart from its normal power supply and regulating system. For example, the invention can be employed for evaluating automotive vehicle generators as they come off the production line. In such testing, it is desirable to obtain the load current of the generator as a function of speed with the terminal voltage maintained at a substantially constant value. In previous testing equipment, an operator was employed to switch in load resistors as the speed of the generator was increased. The object of this was to maintain a substantially constant voltage and to increase the load current in specified increments, for example, increments of 5 amperes. The operator then recorded the speed of the generator of these specified increments and plotted a series of points that were in turn connected to form a curve that indicated load current as a function of speed. This curve was then compared with curves that indicated the maximum and minimum permissible current outputs as a function of speed. This procedure was particularly time consuming and costly, and in large scale production only sample testing could be employed.

The present invention obviates these difficulties by providing an electrical circuit that automatically maintains a constant terminal voltage on an electrical generator, so that load current as a function of speed may be plotted or indicated automatically. In the invention, a direct current amplifier is connected across the output terminals of a generator. A zener diode is connected to the amplifier and to the electrical generator and is poled to prevent conduction of the amplifier until a selected voltage output of the generator is reached. This selected voltage is the voltage at which the generator is to be operated while current output as a function speed is obtained. A variable solid state load is connected across the output terminals of the generator. This variable solid state load preferably comprises a plurality of transistors connected in parallel, with the control electrodes of these transistors connected to the direct current amplifier. When the generator produces an output voltage equal to the selected voltage the zener diode breaks down, and the variable solid state load maintains the output voltage of the generator substantially constant. As the output voltage tends to rise above the selected value as a result of increasing speed of the generator on test, the conduction of the transistors forming the variable solid state load is gradually increased thereby lowering the impedance of the device and maintaining the terminal voltage at a substantially constant value.

An ammeter or other current indicating device is connected in the circuit to indicate load current as a function of speed. A tachometer may be connected to the armature of the generator to indicate the speed. A curve of the output current of the generator as a function of speed may be automatically obtained by applying a signal proportional to speed and a signal proportional to the current output of the generator to an X–Y plotter or to an oscilloscope.

An object of the present invention is the provision of an electrical circuit for obtaining load current as a function of speed of an electrical generator.

Another object of the invention is the provision of an electrical circuit for obtaining load current as a function of speed of a rotary electrical generator by automatically maintaining the terminal voltage of the egnerator at a substantially constant selected value.

Other objects and attendant advantages of the present invention may be readily appreciated when the specification is considered in connection with the attached drawings in which.

Figure 1:
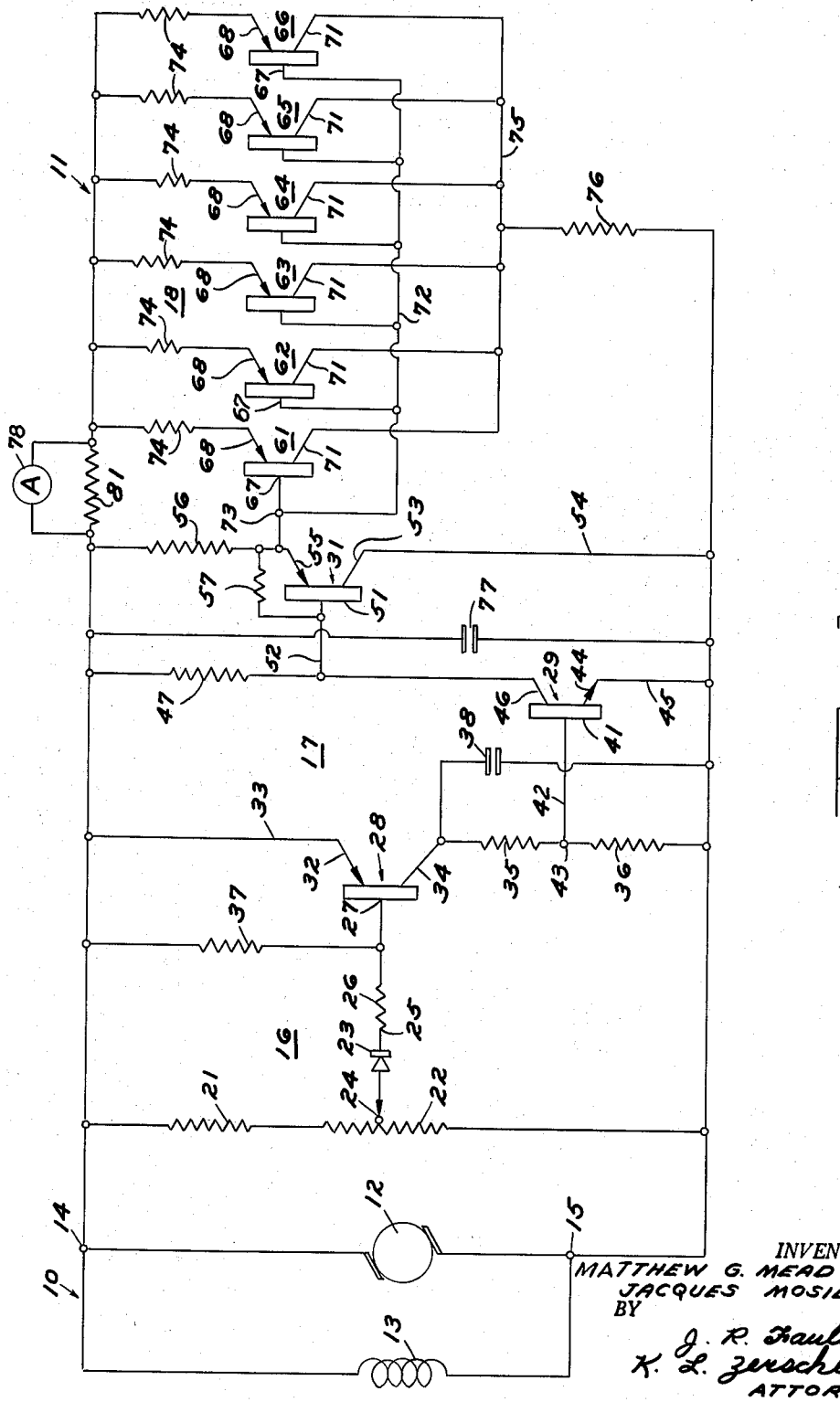
FIG. 1 is a circuit diagram of an electrical generator connected to an electrical circuit, including a solid state constant voltage dynamic load, for maintaining the generator at a substantially constant terminal voltage.

Referring now to the drawings, in which like reference numerals designate like parts throughout the several views thereof, there is shown in FIG. 1 a circuit diagram that includes an electrical rotary generator, generally designated by the numeral 10, connected to an electrical circuit for maintaining the generator at a constant terminal voltage. This circuit is generally designated by the numeral 11.

The electrical rotary generator 10 includes an armature 12 and a field 13 that is connected across the output terminals of the armature. The positive terminal of the armature is designated by the numeral 14, while the negative terminal is designated by the numeral 15. A suitable driving mechanism, not shown, is employed to rotate the armature.

The circuit for maintaining the generator 10 at a constant output voltage includes a non-linear error detector generally designated by the numeral 16, a direct current amplifier generally designated by the numeral 17, and a solid state variable dynamic load generally designated by the numeral 18.

The error detector 16 includes a voltage divider having resistors 21 and 22 connected in series and across the output terminals 14 and 15 of the generator. It also includes a zener diode 23 having one terminal 24 connected to an adjustable slider of the voltage divider and having the other terminal 25 connected through a resistor 26 to the control electrode or base 27 of a solid state device, such as a P-N-P transistor 28.

The P-N-P transistor 28, a N-P-N transistor 29, and a second P-N-P transistor 31 form the direct current amplifier 17 for the circuit. Although these types of transistors are disclosed, it will be apparent to those skilled in the art that any suitable solid state devices may be employed to secure the desired gain.

The transistor 28 includes an emitter-collector or load circuit connected across the output terminals of the generator 10. In the embodiment shown, the emitter 32 is connected to the positive output terminal 14 of the generator through a lead 33, and the collector 34 is connected to the negative output terminal 15 through resistors 35 and 36. The collector 34 is also connected to the generator terminal 15 through a capacitor 38, the purpose of which is to eliminate ripple and hash caused by the commutator of the generator 10. The base 27, in addition to being connected to the resistor 26, is connected to terminal 14 of the generator through a resistor 37 to prevent current leakage through the transistor when it is in the cut-off condition.

The transistor 29 includes a base 41 that is connected by a lead 42 to a junction 43 between resistors 35 and 36. The emitter 44 of the transistor 29 is connected to the negative output terminal 15 of the generator through a lead 45. The collector 46 is connected to terminal 14 of the generator through a resistor 47. Thus, the emitter-collector or load circuit of transistor 29 is also connected across the output terminals 14 and 15 of the generator.

The emitter-collector circuit, or load circuit, of the transistor 29, including the resistor 47, the collector 46 and the emitter 44, is connected to the base 51 of the transistor 31. This is accomplished by connecting the collector 46 of the transistor 29 to the base 51 through a lead 52. The emitter-collector circuit, or load circuit, of transistor 31 is connected across the output terminals 14 and 15 of the generator by connecting the collector 53 to the negative terminal 15 through a lead 54 and by connecting the emitter 55 to the positive output terminal 14 through a resistor 56. The emitter 55 is also tied to the base 51 through a resistor 57. The purpose of this connection is to reduce current leakage through the transistor when it is cut off. This connection maintains the base and the emitter at substantially the same potential prior to conduction.

The solid state variable dynamic load 18 preferably comprises a plurality of transistors connected in parallel. These transistors are generally designated by the numerals 61, 62, 63, 64, 65 and 66. Each of these transistors includes a base 67, an emitter 68 and a collector 71. The bases 67 of these transistors are tied together by a lead 72 that is connected to the emitter 55 of the transistor 31 as at 73. Each of the emitters 68 is connected to the positive output terminal 14 of the generator through a suitable resistor 74. Each of the collectors 71 of these transistors is connected to a lead 75 that in turn is connected to the negative output terminal 15 of the generator through a resistor 76.

A capacitor 77 is also connected across the output terminals 14 and 15 of the generator to reduce ripple and hash caused by the commutator of the armature 12.

In the operation of rotary generators employed on automotive vehicles, it is conventional practice to limit the voltage output through a voltage regulator to a voltage value somewhere in the neighborhood of 15 to 17 volts. The generator usually reaches such an output voltage at comparatively low speeds.

In the operation of the circuit shown in FIG. 1, the generator 10 is connected to be self-exciting, that is, the field 13 is connected across the output terminals 14 and 15 of the armature. When the generator armature 12 is rotated at low speeds, the generator sees essentially an infinite impedance since all of the transistors are cut off. The zener diode 23 is poled so that the transistor 28, and consequently the remainder of the transistors, are kept in their cut off condition until the output voltage of the generator reaches the selected value, somewhere in the neighborhood of 15, the voltage at which the generator would normally operate when installed in a motor vehicle. This value can be set by adjusting the voltage divider arm, that is connected to terminal 24 of zener diode 23, on the resistor 22. When the generator reaches this selected voltage, the zener diode 23 will break down to permit current conduction from the positive terminal 14 of the generator to the negative terminal 15 through the transistor 28.

The current flows from the positive terminal 14, through lead 33, emitter 32, base 27, and then through the resistor 25, the zener diode 23 and a portion of the resistor 22 to the negative terminal 15.

Current also flows from the positive terminal 14 to the negative terminal 15 of the generator through the output circuit of the transistor by way of lead 33, emitter 32, collector 34, resistor 35 and resistor 36. The base 41 of transistor 29 is then raised in potential relative to the emitter 44 and current flows through the lead 42, the base 41, the emitter 44 and the lead 45 to the negative terminal 15 of the generator. This in turn, permits current flow from the positive terminal 14 to the negative terminal 15 of the generator through the transistor 29 by way of resistor 47, the collector 46, the emitter 44 and the lead 45. This action in turn causes the transistor 31 to conduct by lowering the potential of the base 51 relative to the emitter 55. This permits current flow from the emitter through the base and, consequently, current flow from the positive terminal 14 to the negative terminal 15 of the generator through the resistor 56, the emitter 55, the collector 53 and the lead 54.

As a result, the potential of the bases 67 of the transistors 61, 62, 63, 64, 65 and 66 is lowered relative to the emitters 68, thereby permitting current flow from the emitters to the bases. This, in turn, permits current flow from the positive terminal 14 to the negative terminal 15 of the generator through parallel connected transistors 61, 62, 63, 64, 65 and 66 by way of resistors 74, emitters 68, collectors 71, lead 75 and the resistor 76.

If the output voltage of the generator 10 across the terminals 14 and 15 attempts to rise above the selected voltage, the error detector 16 senses this condition and permits more current flow through transistor 28. This condition is amplified by the direct current amplifier 17 and as a consequence, the transistors 61, 62, 63, 64, 65 and 66 are biased into a more fully conducting state, thereby lowering the impedance seen by the generator at the terminals 14 and 15. This in turn lowers the terminal voltage to the desired value. It can be easily understood that if the output voltage of the generator attempts to drop below this selected value, the reverse condition will take place. The transistors 61, 62, 63, 64, 65 and 66 will then be biased further toward their nonconducting states. This raises the impedance seen at the terminals of the generator and increases the terminal voltage of the generator to the desired value.

During the operation as described above and with the generator connected to be driven at increasing speeds over a given speed range, the terminal voltage will attempt to rise as a function of speed. However, as the voltage attempts to rise the transistors 61, 62, 63, 64, 65 and 66 will be brought increasingly into conduction so that the voltage or the IR drop across them will remain constant. Thus, as the speed of the generator increases the resistance of the transistors is lowered and the current through them increases. To sense this increase in lead current an ammeter 78 is connected across a resistor 81 that is connected in series with the output terminals of the generator and the solid state variable load device 18.

A generator testing device for testing generators employed in passenger car vehicle may be constructed employing the following circuit components which are given by way of example only.

Resistor 21—100 ohms, 10 watts
Resistor 22—50 ohms, 2 watts
Zener diode 23—a 10M12Z5 Zener diode
Resistor 26—100 ohms
Resistor 37—47 ohms, 1 watt
Transistor 28—a 2N140 transistor
Resistor 35—560 ohms, 1 watt
Resistor 36—470 ohms, 1 watt
Capacitor 38—500 microfarads having a 15 volt direct current capacity
Transistor 29—a 2N102 transistor
Resistor 47—220 ohms, 1 watt
Transistor 31—a 2N678 transistor
Resistor 56—180 ohms, 1 watt
Resistor 57—47 ohms, 1 watt
Transistors 61, 62, 63, 64, 65, 66—2N277 transistors having a current carrying capacity of 15 amps each
Resistors 74—0.5 ohm each
Resistor 76—1.25 ohms Although various other components may be employed and the above values are given by way of example only, it is to be understood that the current carrying capacity of transistors 61, 62, 63, 64, 65 and 66 must be sufficient to carry the total output current of the generator 10. In case of an automotive vehicle generator this may be a maximum of approximately 90 amperes. It will also be understood by those skilled in the art that various numbers of transistors may be used to construct the solid state variable dynamic load, depending upon the current carrying capacity of the transistors and upon the total current output of the generator.

Figure 2:
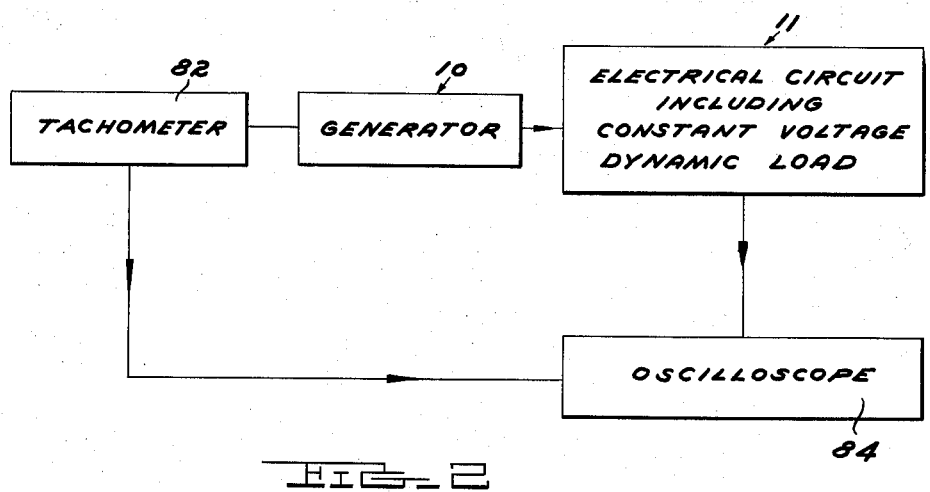
FIG. 2 is a block diagram of a system for automatically indicating load current as a function of speed for a rotary electrical generator maintained at a substantially constant output voltage.

In the testing of automotive vehicle generators as they come off the assembly line, a device shown in block diagram in FIG. 2 may be employed. Here the generator 10 is connected to the electrical circuit 11 including the constant voltage dynamic load, and a tachometer 82 is connected to the armature 12 of the generator to produce an output voltage that is proportional to speed. An oscilloscope 84 having horizontal and vertical deflection plates is provided. The horizontal deflection plates are connected to the output of the tachometer and the vertical deflection plates are connected across the resistor 81 to receive an output voltage that is proportional to the load current of the generator 10. As the generator is rotated with increasing speed from zero to the maximum speed ordinarily employed in automotive vehicles, the oscilloscope will trace out a curve of the load current as a function of speed. This occurs, of course, after the voltage value selected for the breakdown of the Zener diode 23 has been reached.

The operator of the device shown in FIG. 2 may have a set of curves placed over the oscilloscope face with one curve denoting the minimum permissible current curve as a function of speed and the second curve denoting the maximum current curve as a function of speed. As long as the curve produced on the oscilloscope from the generator under test falls between these two curves the generator is acceptable.

Figure 3:
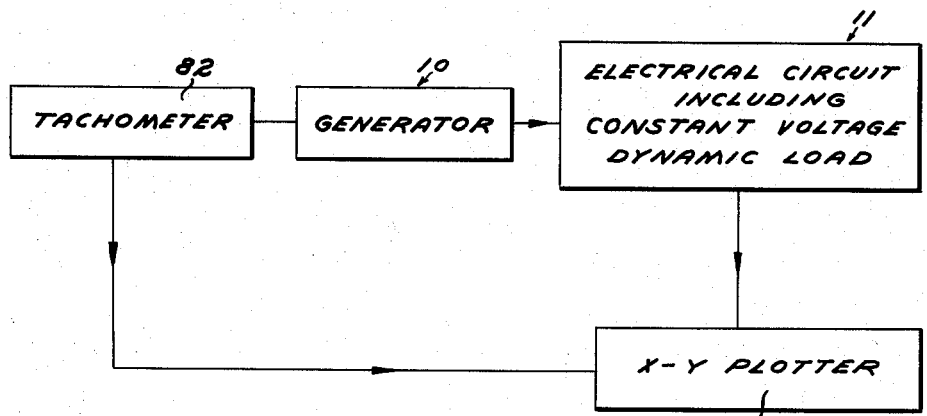
FIG. 3 is a block diagram of another embodiment of the system shown in FIG. 2.

FIG. 3 shows another embodiment similar to that shown in FIG. 2 except that the oscilloscope is replaced by a suitable and conventional X–Y plotter 86. The output voltage from the tachometer is fed to the X axis and the voltage proportional to the load current of the generator is fed to the Y axis. This plotter then plots a curve of the load current of the generator as a function of speed.

Thus, in both the embodiments shown in FIGS. 2 and 3, a curve of generator current versus speed is automatically constructed and the operator thereof can very quickly determine whether or not the generator is acceptable. These devices, shown in FIGS. 2 and 3, may not only be used to sample test a production run, for example one out of ten generators, but may also be employed to check each individual generator as its comes from the line, should this be desirable.

Thus, the present invention provides a means for determining the load current of an electrical generator as a function of speed and for automatically constructing a curve of the load current as a function of speed.

It will be understood that the invention is not to be limited to the exact construction shown and described, but that various changes and modifications may be made without departing from the spirit and scope of the invention as defined in the appended claims.

We claim:

1. An electrical circuit for maintaining a substantially constant terminal voltage on an electrical generator comprising, a zener diode, a direct current amplifier having output terminals connected across the electrical generator and an input circuit electrically coupled to the electrical generator, said zener diode being poled to prevent conduction of said direct current amplifier when the terminal voltage of the electrical generator is below a selected value and to permit conduction of said current amplifier when said terminal voltage is above said selected value, a variable solid state dynamic load connected across the electrical generator, said variable solid state dynamic load carrying substantially all of the output current of said electrical generator, and means connecting the output terminals of said direct current amplifier to said variable solid state dynamic load for decreasing the impedance of said variable solid state shunt load if the terminal voltage of the electrical generator attempts to increase.

2. The electrical circuit of claim 1 in which a current indicating means is connected in circuit with the electrical generator and the variable solid state dynamic load.

3. In an electrical circuit for determining current output at a substantially constant terminal voltage of an electrical generator having output terminals, the combination comprising, a voltage divider connected across the output terminals, a P-N-P transistor having a base and an emitter-collector circuit connected across the output terminals of the electrical generator, a zener diode connected to said base and to said voltage divider, said zener diode being poled to prevent conduction of said P-N-P transistor until the output voltage of the electrical generator reaches a selected value, a N-P-N transistor having a base connected to the emitter-collector circuit of said P-N-P transistor and an emitter-collector circuit connected across the output terminals of the electrical generator, a second P-N-P transistor having a base and an emitter-collector circuit, said base being connected to the emitter-collector circuit of said N-P-N transistor and said emitter-collector circuit being connected across the output terminals of the electrical generator, a variable solid state dynamic load connected across the electrical generator, said variable solid state dynamic load carrying substantially all of the output current of said electrical generator, means connecting said variable solid state dynamic load to the output circuit of said second P-N-P transistor for decreasing the impedance of said variable solid state dynamic load as the output voltage of said generator attempts to increase above said selected value, said variable solid state load comprising a plurality of P-N-P transistors each having an emitter-collector circuit connected across said output terminals and a base connected to the emitter of said second P-N-P transistor.

4. The electrical circuit of claim 3 in which a current indicating means is connected in series with the variable solid state dynamic load and the output terminals of the electrical generator.

5. A testing means for determining current output as a function of speed of a rotary electrical generator comprising a rotary electrical generator including a rotor and output terminals, means coupled to said rotor for producing a signal proportional to rotor speed, a variable impedance solid state load connected to the output terminals, means coupled to the output terminals and said variable impedance solid state load for sensing the output voltage of said generator and for varying the impedance of said variable impedance solid state load inversely as the output voltage of said generator in a functionally related way so as to maintain the output voltage of said generator substantially constant, and means coupled in circuit with said last mentioned means and the output terminals of the generator for producing a signal proportional to the load current of the generator, and means connected to receive the signal proportional to rotor speed and the signal proportional to load current for constructing a curve of the load current of the generator as a function of the rotor speed.

6. The combination of claim 5 in which the means for constructing a curve of the load current of the generator as a function of the rotor speed comprises an oscilloscope.

7. The combination of claim 5 in which the means for constructing a curve of the load current of the generator as a function of the rotor speed comprises an X–Y plotter.

8. A testing device for determining current output as a function of speed of a rotary electrical generator having a rotor and output terminals, the output of said electrical generator increasing substantially as a direct function of rotor speed, comprising means coupled to said rotor for producing a signal proportional to rotor speed, an electrical circuit connected to the output terminals of said electrical generator, said electrical circuit including a zener diode, a direct current amplifier, said zener diode being connected to the output terminals of said electrical generator and the direct current amplifier and being poled to prevent conduction of said direct current amplifier when the terminal voltage of the electrical generator is below a selected value, a variable solid state dynamic load connected across the output terminals of said electrical generator to receive substantially all of the output current of said electrical generator, whereby substantially all of the output current of said electrical generator flows through said variable solid state dynamic load, means connecting said direct current amplifier to said variable solid state dynamic load for decreasing the impedance of said variable solid state dynamic load as the terminal voltage of the electrical generator attempts to increase, current sensing means connected in circuit with said electrical generator and the variable solid state dynamic load for sensing the current passing through said variable solid state dynamic load, and display means connected to said current sensing means and to said means coupled to said rotor for producing a signal proportional to rotor speed for displaying a curve of the load current of said electrical generator as a function of rotor speed as the terminal voltage of said electrical generator is held substantially constant.

9. In an electrical circuit for determining current output at a substantially constant voltage of an electrical generator having output terminals, the combination comprising a voltage divider connected across the output terminals, a first transistor having an emitter-collector circuit and a base, said emitter-collector circuit being connected across said output terminals, a zener diode connected to said base and said voltage divider and being poled to prevent conduction of said transistor until the output voltage reaches a selected value, a plurality of transistors, each of said transistors having an emitter-collector circuit and a base, means connecting said emitter-collector circuits in parallel and across said output terminals, and means coupling said first transistor with the bases of said plurality of transistors for increasing the conduction of said plurality of transistors as the conduction of said first transistor increases due to an increase in the output voltage of said generator.

10. The combination of claim 9 in which a current indicating means is connected in circuit with said emitter-collector circuits of said plurality of transistors for measuring current therethrough.

11. A testing means for determining current output as a function of speed of a rotary electrical generator comprising a rotary electrical generator the voltage of which is limited to a substantially constant value during a majority of the operating time of said generator, said generator including a rotor and output terminals, a variable solid state load means connected to the output terminals of said generator, said variable solid state load means carrying substantially all of the output current of said rotary electrical generator, means coupled to said output terminals and said variable solid state load for maintaining said variable solid state load in its highest impedance state when the voltage output of said generator is below said substantially constant value and for varying the impedance of said variable solid state load as an inverse function of the output voltage of said generator when the output voltage rises above said substantially constant value in such a way as to maintain the output voltage of said generator substantially constant, means coupled to said rotor for producing a signal as a function of rotor speed, means coupled in circuit with said variable solid state load for producing a signal as a function of the current through said variable solid state load, and means coupled to receive the signal as a function of rotor speed and the signal as a function of current through said variable solid state load for displaying a curve of the current through said variable solid state load as a function of rotor speed.

References Cited by the Examiner
UNITED STATES PATENTS

| | | | |
|---|---|---|---|
| 2,625,675 | 1/53 | Lupo. | |
| 2,637,204 | 5/53 | Short | 324—158 |
| 2,789,164 | 4/57 | Stanley | 330—20 |
| 2,906,941 | 9/59 | Brolin | 323—22 |
| 2,971,102 | 2/61 | Schultz | 323—22 |
| 3,052,117 | 9/62 | Miller et al. | 324—158 |
| 3,098,964 | 7/63 | Hetzler | 307—88.5 |

WALTER L. CARLSON, *Primary Examiner.*

LLOYD McCOLLUM, *Examiner.*